United States Patent [19]

Garcia et al.

[11] Patent Number: 4,694,605
[45] Date of Patent: Sep. 22, 1987

[54] MOSQUITO ELIMINATOR

[76] Inventors: Armando Garcia, 4821 Cheryl St., Corpus Christi, Tex. 78415; David V. Nesmith, 3805 Reynosa St., Corpus Christi, Tex. 78416

[21] Appl. No.: 891,373
[22] Filed: Jul. 31, 1986
[51] Int. Cl.[4] ............................................. A01M 3/02
[52] U.S. Cl. ....................................................... 43/137
[58] Field of Search ...................... 43/137; 15/169, 184
[56] References Cited

U.S. PATENT DOCUMENTS

| 161,870 | 4/1875 | Dorrison . | |
|---|---|---|---|
| 395,022 | 5/1888 | Wells . | |
| 1,016,734 | 2/1912 | Bing | 43/137 |
| 1,055,998 | 3/1913 | Allis et al. | 43/137 |
| 2,485,822 | 10/1949 | Goldrich | 43/137 |
| 3,412,501 | 11/1968 | Rosen . | |
| 3,905,146 | 8/1975 | Ralston . | |
| 4,120,115 | 10/1978 | Mushkin | 43/137 |
| 4,227,278 | 10/1980 | Raskin et al. | 15/184 |
| 4,387,480 | 6/1983 | Cobianco | 15/169 |

*Primary Examiner*—M. Jordan
*Attorney, Agent, or Firm*—Harvey B. Jacobson

[57] ABSTRACT

A switch device for swatting insects or for use as a brush and the like has a tubular handle, a switch in the handle formed from nylon strands which are folded double about a fold line, a cord having one end tied around the fold line to secure the switch and another end secured to the inner end of the handle. The switch can be fully retracted into the handle for storage or it can be pulled from the handle by different amounts to suit its different modes of use. The switch is retained in the handle by friction.

6 Claims, 3 Drawing Figures

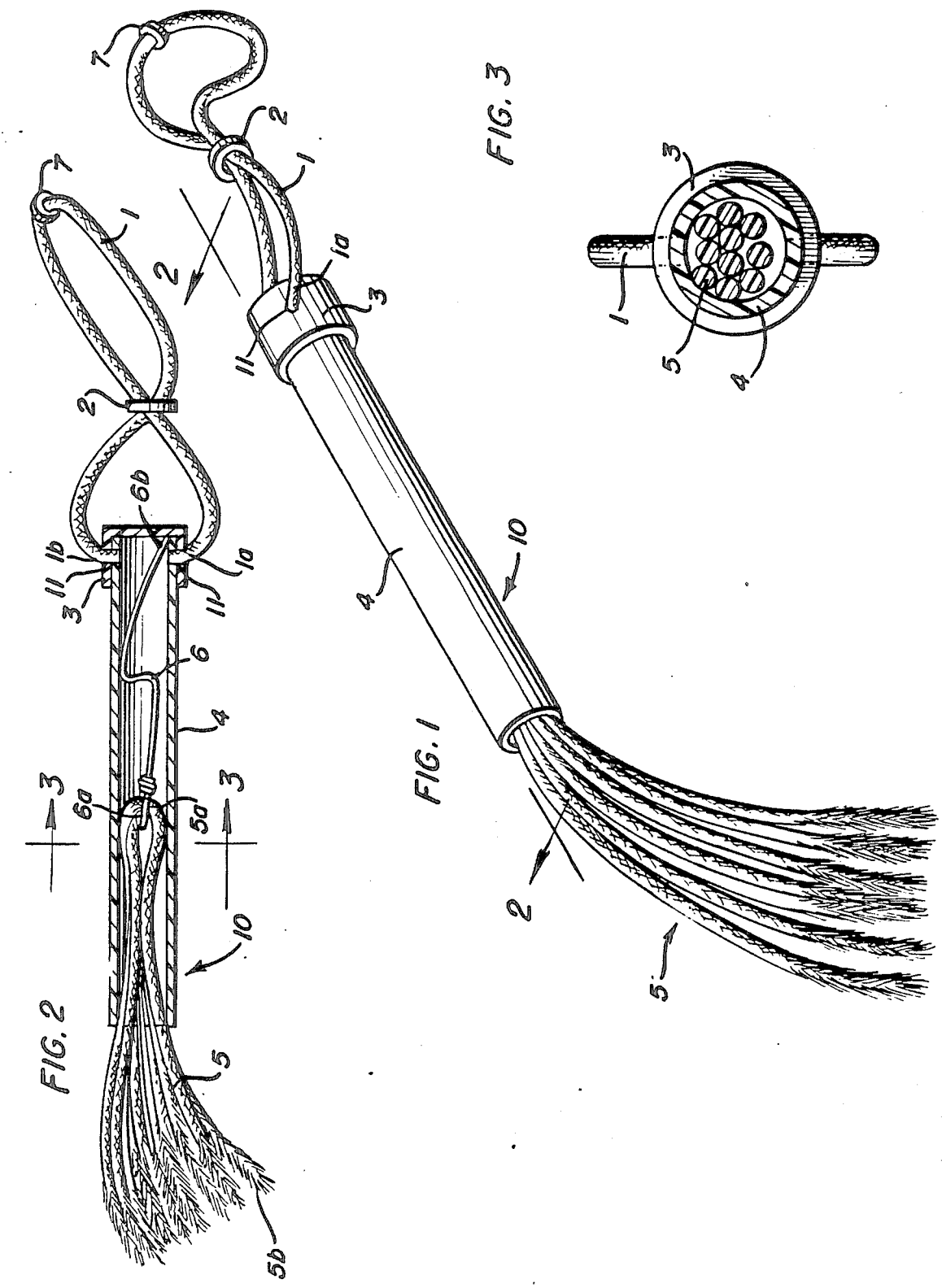

MOSQUITO ELIMINATOR

BACKGROUND AND SUMMARY OF THE INVENTION

This invention relates to a switch device suitable for swatting insects such as mosquitoes, flies, gnats, ants and the like and which can also be used to repel bees or wasps, to chase dogs and which can also be used as a brush or duster, for example, for removing lint from clothing or for general dusting.

The invention provides an adjustable switch device suitable for the purposes indicated and which comprises a plurality of strand elements formed into a switch, a tubular handle and an adjustable securing means attaching the switch within the handle for adjustable and selective movement of the switch therein to expose different lengths of the strands from one end of the handle depending on the purpose to which the switch is to be put. In a preferred form of the invention, for example, the switch may comprise individual nylon strands folded in half about a fold line and secured together by one end of a cord forming the securing means, the one end of the cord being tied around the fold line of the switch and the other end of the cord being secured within the tubular handle.

The flexible strands forming the switch may be retracted into the handle and their free ends exposed therefrom to the extent required for the particular purpose to which the switch is being put. Thus, for example, with the switch fully extended from the handle, the strands may be used to swat insects or the device may be used as a whip, and with the strands partly extended the device may be used as a brush or duster. The device can be used as a swatter to kill most of the aforementioned insects or even cockroaches. Although the flexible strands work in a whip-like motion, in normal use, this action will not cause any injury. To prevent misplacement or loss, the device may be supported by an adjustable carrying cord which can be adjusted snugly around the wrist of a user so that the device may be carried effortlessly until needed. The device may be made in fluorescent or luminescent colors as a safety aid, for example, for bicycle users, joggers, hikers and the like.

The device may be made wholly of plastic materials and the total absence of metal or metallic parts therefore eliminates corrosion and health hazards. The entire device being constructed of durable, washable plastic is practically indestructible in normal use. There are no slots, guides, plugs, actuators, spreaders or separators to wear out or fall apart. To store the switch strands in the handle, they are simply pushed gently into the handle where friction will keep them retracted neatly in place until needed. To use the device, the strands are gently pulled on until partially or fully extended as required. The long flexible strands will conform to any surface thereby making it easier to kill insects on edges of tables, windowsills or corners as well as on flat surfaces. The device has alternative uses such as a horsewhip or as a training aid for dogs.

Applicant is aware of the following U.S. patents relating to switch devices and the like. However, none of these discloses a device having the features of the present invention.

| 161,870 | S. A. Dorrison | Apr. 13, 1975 |
| 395,022 | E. F. Wells | Dec. 25, 1888 |
| 1,055,998 | A. Allis et al | Mar. 18, 1913 |
| 3,412,501 | L. B. Rosen | Nov. 26, 1968 |
| 3,905,146 | C. H. Ralston | Sept. 16, 1975 |
| 4,120,115 | N. M. Mushkin | Oct. 17, 1978 |

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a switch device in accordance with the invention.

FIG. 2 is a sectional view on line 2—2 of FIG. 1.

FIG. 3 is a sectional view on line 3—3 of FIG. 2.

DESCRIPTION OF THE PREFERRED EMBODIMENT

The illustrated switch device 10 comprises a switch 5 made of a plurality of strands of flexible braided rope, for example, five nylon strands folded in half at 5a to make ten strands or whips with the free ends of the strands 5 being separated partially into individual resilient filaments which are partially spread apart at 5b to form bristles. The switch 5 is slidably received in a tubular handle 4 and is retained by means of a retention cord 6 having one end 6a tied around the fold line of the switch to secure the switch strands and the other end 6b secured by any suitable means internally at one end of the tubular handle. The tubular handle may, for example, be about eight inches in length and made of ¾ inch PVC tubing. The folded switch may be of similar length and the cord 6 has a length so that when the strands 5 are telescoped into the handle 4, the free ends 5b will project from the end of the handle and the folds 5a will not move outwardly beyond the free end of the handle. The rear end of the handle, to which the cord 6 is secured may be covered by a PVC end cap 3 and cord 6 may, for example, be trapped between the cap and the end of the tube for securement. Cord 6 may be a flexible rayon fishing line.

The device may be provided with an adjustable nylon carrying cord 1 of flexible, braided and tubular construction and having its respective ends 1a and 1b secured in aligned openings formed diametrically in the cap 3 and tube 4, the openings being indicated by references 11 and the ends of the cord being secured in the openings by any suitable means. A rigid ring 2 constructed from a section of PVC tubing or the like is slidably fitted on the carrying cord to form a pair of cord loops of adjustable length, for example, in order to secure the device around a user's wrist. A safety bead 7 prevents accidental dislodging of the adjustment ring 2.

The switch 5 may be adjusted lengthwise in the handle by pulling or pushing same out of and into the handle and friction will retain the strands in the selected position. Clearly, the thickness and number of the strands are related to the handle diameter to provide such frictional tension. The switch may be fully retracted into the handle for transport or storage and can be extended to the degree necessary for the numerous uses to which the device can be put as described above.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An adjustable switch device which can be used selectively in swatting insects and the like or as a brush, the device comprising a plurality of strand elements formed into a switch, a tubular handle and an adjustable securing means attaching the switch into the handle for adjustable and selective movement of the switch therein to expose different lengths of the strands from one end of the handle as required, said securing means comprising a length of cord securing a rear end of the switch to the part of the handle remote from said one end for movement of the switch between a fully retracted position within the handle and a fully extended position in which at least a major length of the switch is exposed from said one end, said handle having a cap on the end opposite said one end and said cord being trapped between the handle and the cap.

2. A switch device as defined in claim 1 including a carrying cord having opposite ends secured in aligned openings formed in the handle and cap.

3. A switch device as defined in claim 1 whereas the strands are folded double about a fold line to form the switch and the cord is tied around the switch at the fold line to secure the switch.

4. A switch device comprising a tubular handle, a switch in the handle formed from plural strands folded double about a fold line, a cord having one end tied around the fold line to secure the switch and another end secured in the handle, the length of the cord permitting selective movement of the switch along the handle to expose a required length of the switch opposite the fold line from one end of the handle, said handle having a cap at its opposite end and said cord being secured to the tube at the opposite end.

5. A device as defined in claim 4 including a carrying cord having opposite ends secured in the aligned apertures formed in the cap and handle.

6. A switch device comprising a tubular handle, an elongated switch including a plurality of elongated substantially parallel strands, said switch being lengthwise slidingly received in said handle for shifting longitudinally of said handle between a substantially fully retracted position therein with one set of ends of said strands projecting outwardly of one end of said handle and an extended position with said one set of ends of said strands extended appreciably from said one end of said handle, said switch being frictionally engaged with the inner surfaces of said handle for frictionally retaining said switch in adjusted retracted and extended positions relative to said one end of said handle, and elongated flexible tether means having one end anchored relative to the other set of ends of said strands and the other end of said tether means anchored relative to the other end of said handle, the effective length of said tether means limiting extension of said switch relative to said handle to said extended position.

* * * * *